W. I. OHMER, D. B. WHISTLER & J. E. McALLISTER.
OPERATING MECHANISM FOR REGISTERS.
APPLICATION FILED FEB. 9, 1910.

1,000,542.

Patented Aug. 15, 1911.

Witnesses
G. Howard Walmsley
Edward Reed

Inventors
Wilfred I. Ohmer,
David B. Whistler,
John E. McAllister,
By R. A. Toulmin,
Attorney

W. I. OHMER, D. B. WHISTLER & J. E. McALLISTER.
OPERATING MECHANISM FOR REGISTERS.
APPLICATION FILED FEB. 9, 1910.

1,000,542.

Patented Aug. 15, 1911.

Witnesses
G. Howard Walmsley,
Edward L. Reed.

Inventors
Wilfred I. Ohmer,
David B. Whistler,
John E. McAllister,
By H. A. Toulmin,
Attorney

UNITED STATES PATENT OFFICE.

WILFRED I. OHMER, DAVID B. WHISTLER, AND JOHN E. McALLISTER, OF DAYTON, OHIO, ASSIGNORS TO THE RECORDING AND COMPUTING MACHINE COMPANY, OF DAYTON, OHIO, A CORPORATION OF OHIO.

OPERATING MECHANISM FOR REGISTERS.

1,000,542.  Specification of Letters Patent.  Patented Aug. 15, 1911.

Application filed February 9, 1910. Serial No. 542,827.

*To all whom it may concern:*

Be it known that we, WILFRED I. OHMER, DAVID B. WHISTLER, and JOHN E. McALLISTER, citizens of the United States, residing at Dayton, in the county of Montgomery and State of Ohio, have invented certain new and useful Improvements in Operating Mechanism for Registers, of which the following is a specification, reference being had therein to the accompanying drawings.

This invention relates to operating mechanism for registers, and is designed more particularly for use in connection with fare registers on street cars of the type popularly known as the "pay-as-you-enter" cars and "pay-within" cars.

The object of the invention is to provide an easily actuated mechanism of this character which will be positive in its operation and which will be of such a construction that it will not be liable to be broken or to be disarranged to such an extent as to interfere with its operation, thereby affording an easily actuated and reliable operating mechanism.

It is also an object of the invention to provide a mechanism of this character of a compact construction, which can be so arranged within the car as not to interfere with the equipment of the car, and which, when in position, will have a neat, finished appearance.

It is a further object of the invention to provide means for actuating this mechanism from either platform of the car or from the interior of the car; to provide actuating devices which can be detached and transferred from one platform to the other; also to provide the actuating devices on the platform with "full-stroke" mechanism which will oblige the operator to complete the registration of a fare before the mechanism can be again operated; to provide indicators which are so arranged and operated as to indicate to the passengers in all parts of the car and on both platforms the character of the fare registered; and to provide a suitable signal mechanism actuated by the movement of the operating mechanism for attracting attention to the indicator when a fare is registered.

In the accompanying drawings.

In these drawings we have illustrated one embodiment of our invention and have shown the same as applied to a street car of that type known as the "pay-as-you-enter" cars. As is well known, this car comprises a body portion having a platform at each end thereof, the platforms being separated from the body portion by partitions which are here indicated at 1. These partitions are provided with doorways 2 arranged near each side of the car and that portion of each partition lying between the two doorways is usually provided with a glass panel, as shown at 3. The conductor usually occupies a position on the platform between the two doorways and adjacent to the partition, that portion of the platform occupied by the conductor being fenced off by a railing 4. Inasmuch as the car itself forms no part of the invention we have herein shown and described only such portions thereof as are necessary to an understanding of the application of the invention thereto. The fare register may be mounted within the car in any suitable position, but is usually mounted on the upper portion of one of the partitions and is so shown in these drawings, in which the register is conventionally shown at 5. This register may be of any suitable construction and comprises setting mechanism for setting the mechanism of the register to register a particular fare. This setting mechanism is here shown as including a setting shaft 6. The register further comprises actuating mechanism for actuating the register to register that particular fare for which it has been set. The actuating mechanism, in the present instance, includes an actuating member, such as a reciprocating slide bar 7.

Figure 17:
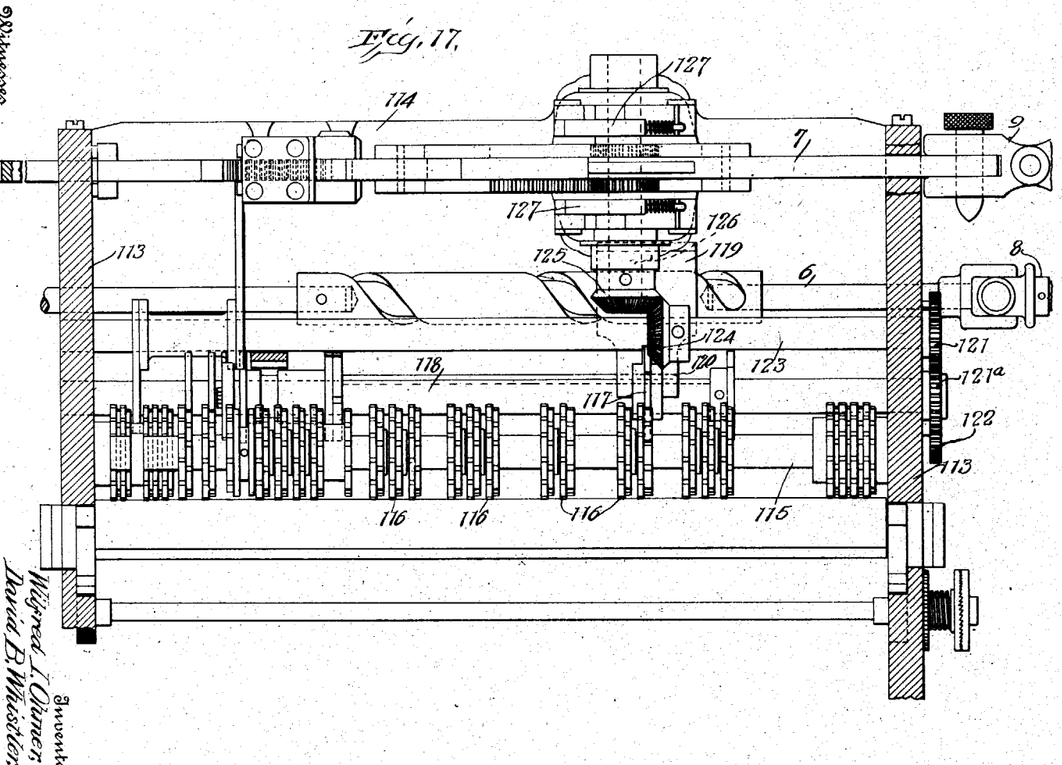
Fig. 17 is a vertical, sectional view of a register showing in elevation a series of groups of counters and the setting and actuating mechanism therefor.
Figure 18:
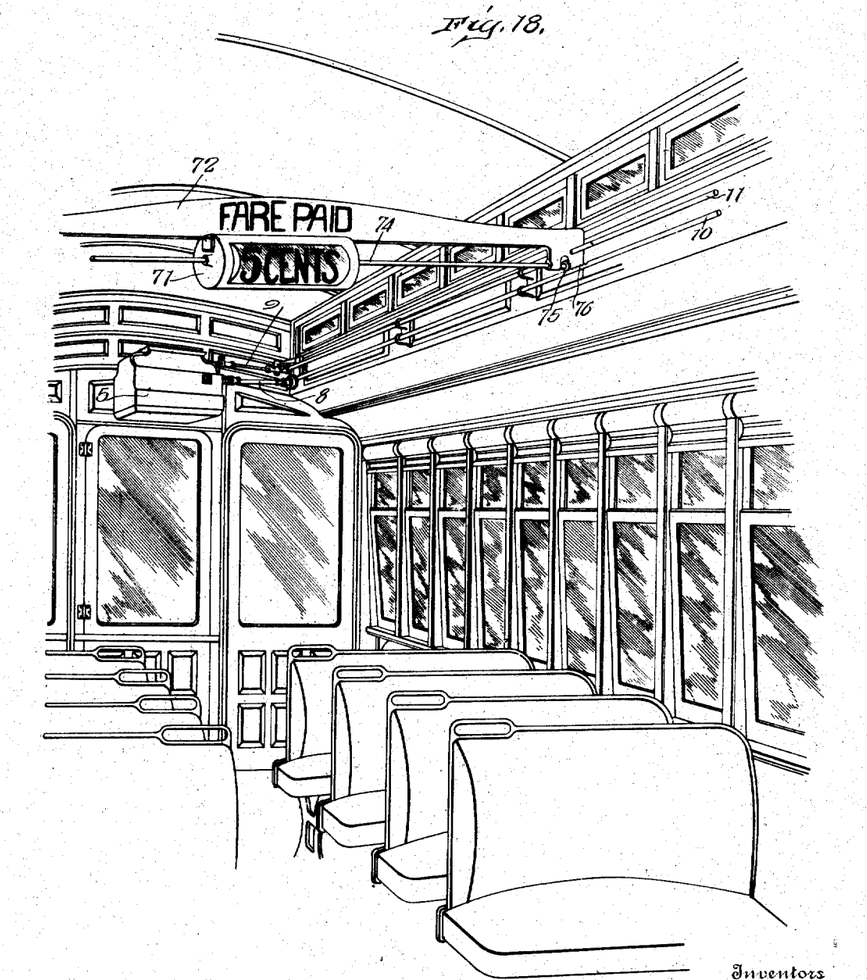
Fig. 18 is a view of a portion of a street car showing the invention mounted therein.

The register and the several parts comprising the same form no part of the present invention and those here shown are chosen for the purpose of illustration only. As illustrated in Fig. 17 the register comprises a frame consisting of the end members 113 connected one to the other by tie bars, one of which is shown at 114. Mounted in these end members is a counter shaft 115 having mounted thereon a plurality of groups of counters 116 of ordinary construction, each of which is adapted to register a different item. An actuator comprising a one tooth gear 117 is mounted on an actuator shaft 118 extending parallel with the counter shaft 115 and this actuator is adapted to be moved into operative relation with any one of the groups of counters 116, thereby setting the register to register the particular fare which has been received. This movement of the actuator is imparted thereto by means of a setting shaft which, in the present instance, comprises a screw shaft 6 which has mounted thereon a nut 119 having a depending yoke 120, the arms of which engage the opposite sides of the gear 117 and move the same longitudinally to the shaft 118. When the setting member or shaft 6 is rotated in the manner hereinafter described the register will be set to register the aforesaid particular item. The actuating gear 117 is slidably mounted on the shaft 118 and this shaft is rotated to cause the gear to actuate the particular group of counters with which it is in operative relation. As here shown the shaft 118 is provided with a gear 122 which meshes with an intermediate gear 121ª which, in turn, meshes with a gear 121 rigidly secured to a shaft 123 rotatably mounted in the frame members 113 and having a bevel pinion 124 meshing with a corresponding pinion 125 secured to a vertical shaft 126 which is operatively connected with an actuating member, such as the slide bar 7, by suitable clutch mechanism, as indicated at 127. Reciprocatory movement is imparted to this actuating member in the manner hereinafter described to rotate the shaft 118 and actuate the group of counters with which the actuating member 117 is in operative relation to cause the particular fare which has been received to be registered.

Figure 8:
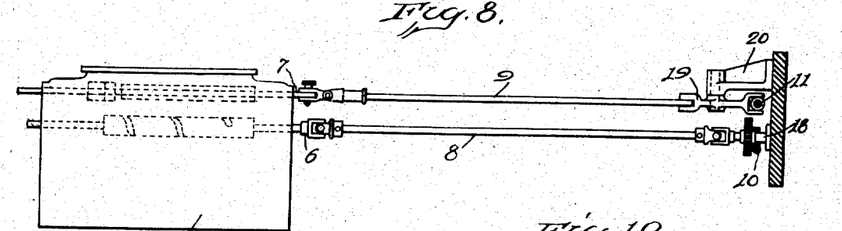
Fig. 8 is a detail view showing the connecting rods extending between the register and the operating rods.
Figures 9, 10:
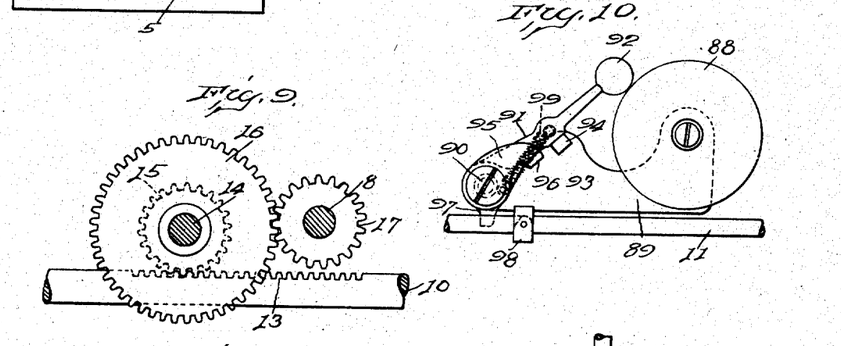
Fig. 9 is a detail view of the mechanism for operatively connecting one of the operating rods to the connecting rod for the setting shaft.
Fig. 10 is a detail view of the bell-ringing mechanism.
Figure 11:
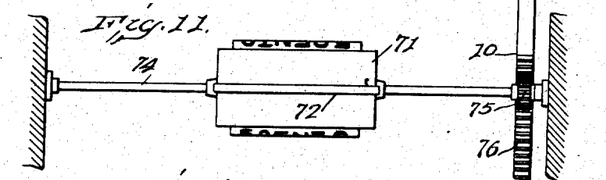
Fig. 11 is a top, plan view of the central indicator and its operating mechanism.
Figure 12:
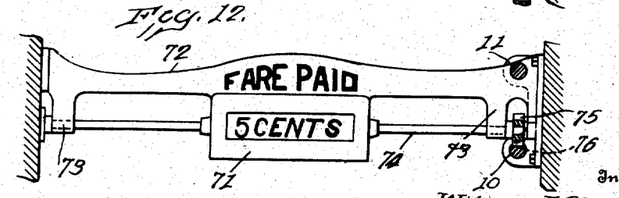
Fig. 12 is an elevation of what is shown in Fig. 11.

The setting member 6 and the actuating member 7 are operatively connected by means of connecting rods 8 and 9 with actuating members 10 and 11, respectively. These actuating members are preferably arranged lengthwise of the car and so mounted therein as to be capable of longitudinal movement and are, in the present instance, shown as comprising two rods slidably mounted in brackets 12 arranged along the side of the car near the top thereof. The arrangement of the rods may be such as to accommodate the same to the interior of the car or to meet existing conditions, but we have here shown them as arranged one above the other and have shown the lower rod 10 operatively connected to the connecting rod 8 for the rotary setting member 6 of the register. The longitudinally movable rod 10 is connected to the connecting rod 8 by means of a suitable rack and gearing. In the present instance the teeth comprising the rack are formed directly in the upper portion of the rod 10, as shown at 13. A stud shaft 14 extends outwardly from the wall of the car above the rod 10 and has mounted thereon a pinion 15 which meshes with the rack 13 and has rigidly secured thereto a gear 16, which, in turn, meshes with a gear 17 which is rigidly secured to the rod 8, the outer end of which is journaled in a suitable bearing 18 supported from the side of the car. The relative diameters of the several gears are such that a comparatively small amount of longitudinal movement on the part of the rack 13 formed in the rod 10 will rotate the connecting rod 8 and the setting member 6 sufficiently to move the setting member throughout its range of movement.

The upper rod 11 is operatively connected by means of the connecting rod 9 with the actuating member 7 of the register. The rod 11 is, in the present instance, connected to the connecting rod by means of a bell crank lever 19 which is pivotally supported upon a bracket 20 secured to the side of the car and having one arm connected to the rod 11 and the other arm to the rod 9, the connection between the rod 11 and the corresponding arm of the bell crank lever being a loose one to compensate for the arc described by the outer end of the arm of the lever.

The actuating devices for the two operating rods may be of any suitable character and may be located in any suitable position, but we prefer to provide means whereby these rods may be actuated from either platform of the car by the conductor when he is in position to collect fares as the passengers enter the car. To this end we have here shown the ends of the rods 10 and 11 as projecting through and beyond the partitions 1, each rod being connected to the adjacent ends of bell crank levers 21 and 22, respectively. These levers are pivotally mounted on studs 23 carried by brackets 24 mounted on the outer sides of the respective partitions 1, it being understood that this mechanism is duplicated at the opposite ends of the car. The other arms of the respective bell crank levers 21 and 22 are connected by means of connecting rods 25 and 26 with crank arms 27 and 28. Each uppermost crank arm 28 is rigidly secured to a vertically arranged shaft 29 journaled at its upper end in a bearing 30 secured to the outer wall of the adjacent partition 1 and supported at its lower end in a bearing or socket 31 formed in the lower wall of a housing 32 rigidly secured to the floor of the platform. The shaft 29 may be moved about its longitudinal axis in any suitable manner and motion thus imparted, through the medium of the crank arm 28, connecting rod 26 and bell crank lever 22, to the operating rod 11. In the present instance we have shown a foot-operated device for so actuating the shaft which comprises a foot lever 33 having heel and toe plates 34 and 35, respectively, and rigidly secured to one end of a horizontal shaft 36 which is journaled at one end in a bracket 37 supported upon the floor of the platform and at the other end in a bearing 38 formed in one wall of the housing 32. The inner end of the shaft 36 extends beyond the inner end of the bearing 38 and has mounted thereon a segmental bevel gear 39 which meshes with a bevel pinion 40 rigidly mounted on the shaft 29. Thus, it will be apparent that the movement of the foot lever about its pivotal center will impart a rocking movement to the shaft 29. Suitable "fullstroke" mechanism is connected to the foot lever 33 to oblige the same to complete its movement in one direction before it can be moved in the opposite direction. As here shown, this mechanism comprises a depending plate or finger 41 having a series of teeth 42 formed in the lower edge thereof. A short horizontal shaft 43 is mounted in suitable bearings 44 formed in the bracket 37 and has rigidly secured thereto a projection or pawl 45. A spring 46, secured at one end to an arm 47 rigidly connected to the shaft 43 and at the other end to an arm 48 projecting from the bracket 37, tends to hold the pawl 45 normally in a substantially vertical position. This pawl is arranged in the path through which the toothed plate 41 must travel when the foot lever 33 is moved about its pivotal center. When one edge of the plate engages the pawl it is moved about its pivotal center and the teeth ride over the same, but, should an attempt be made to move the lever in the opposite direction, the pawl will engage the tooth which last passed it and lock the plate against movement in that direction. When the foot lever has completed its movement in the direction in which it first started, the toothed plate will have passed the pawl and the pawl will have again assumed a vertical position, and, as the foot lever makes its return movement, the toothed plate will ride over the pawl in the opposite direction in the same manner as above described. The foot lever 33 is preferably provided with a guard 49 which extends over the two bearings formed in the bracket 37 and supports the operator's shoe out of engagement therewith. It is also desirable that this foot-operated actuating device should be removable in order that it may be transferred from one platform to the other and thereby remove from the platform the obstruction caused thereby and also prevent the unauthorized manipulation of the mechanism. To enable the device to be so removed the bracket 37 is provided with a base plate 50 of a relatively large size and this base plate has a depending lug or projection 51 adapted to enter a socket 52 formed in the floor of the platform. When the projection is in position in the socket the device will be held against all lateral or tilting movement, but a straight upward pull will detach the bracket and its connected parts from the floor of the car. In order that the shaft 36 may be detached from the shaft 29 we have formed the shaft 36 in two parts, the ends of each part terminating between the ends of the bearing 38 in the housing 32 and the abutting ends being cut away or scarfed, as shown at 53, to permit the outer portion of the shaft to be withdrawn but to hold the same, when in position, against rotary movement relative to the inner portion of the shaft. The shaft 36 has sufficient play in the bearing 38 to permit the outer end of the same to be raised such a distance as will permit the projection 51 to be withdrawn from its socket, thereby enabling the whole foot-operated device to be withdrawn.

Figure 1:
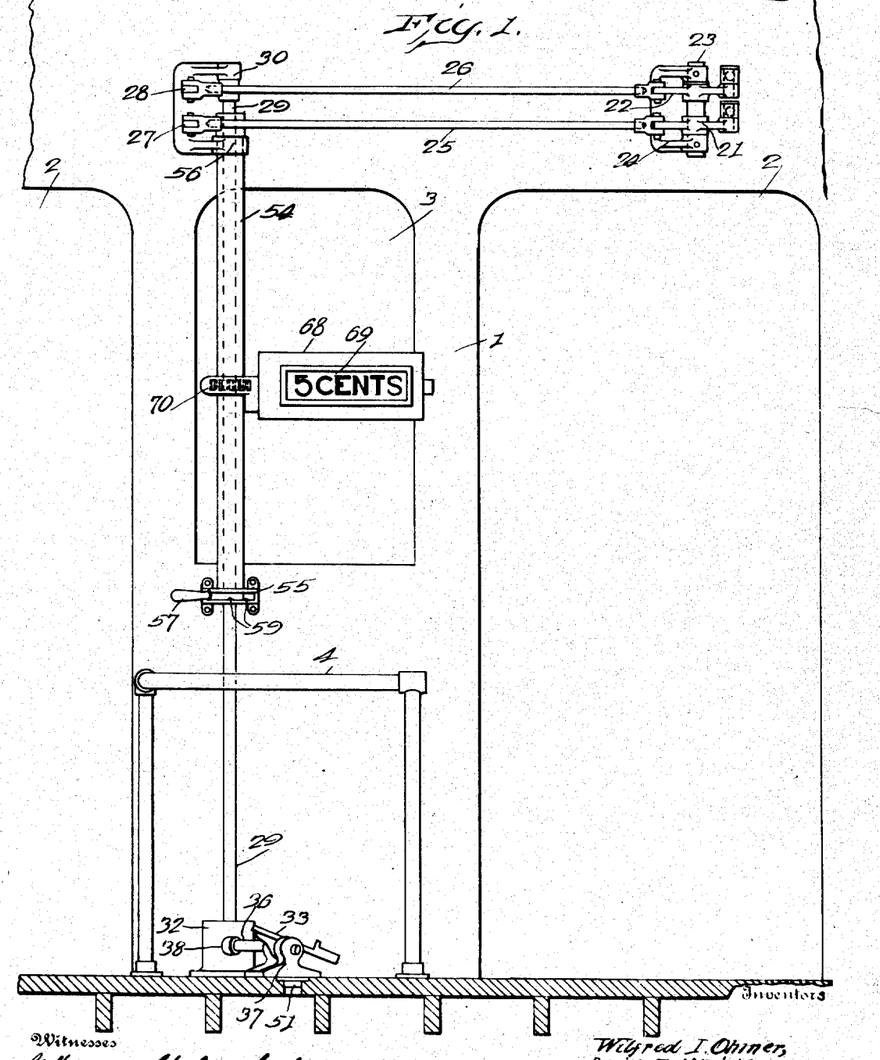
Figure 1 is an elevation of the partition between the car platform and the body portion of the car, showing the invention applied thereto.
Figure 2:
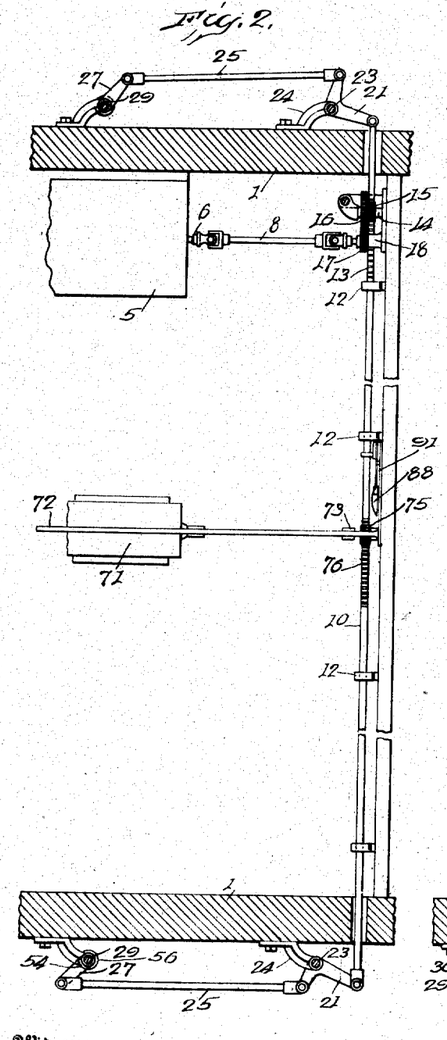
Fig. 2 is a top, plan view of that portion of the mechanism which operates the setting devices.
Figure 3:
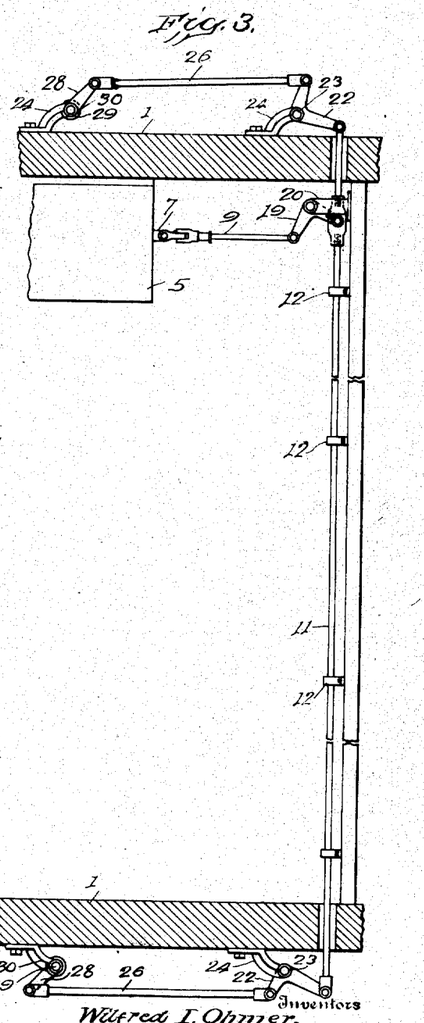
Fig. 3 is a top, plan view of that portion of the mechanism which actuates the operating devices for registering a fare.
Figures 4, 5, 6, 7:
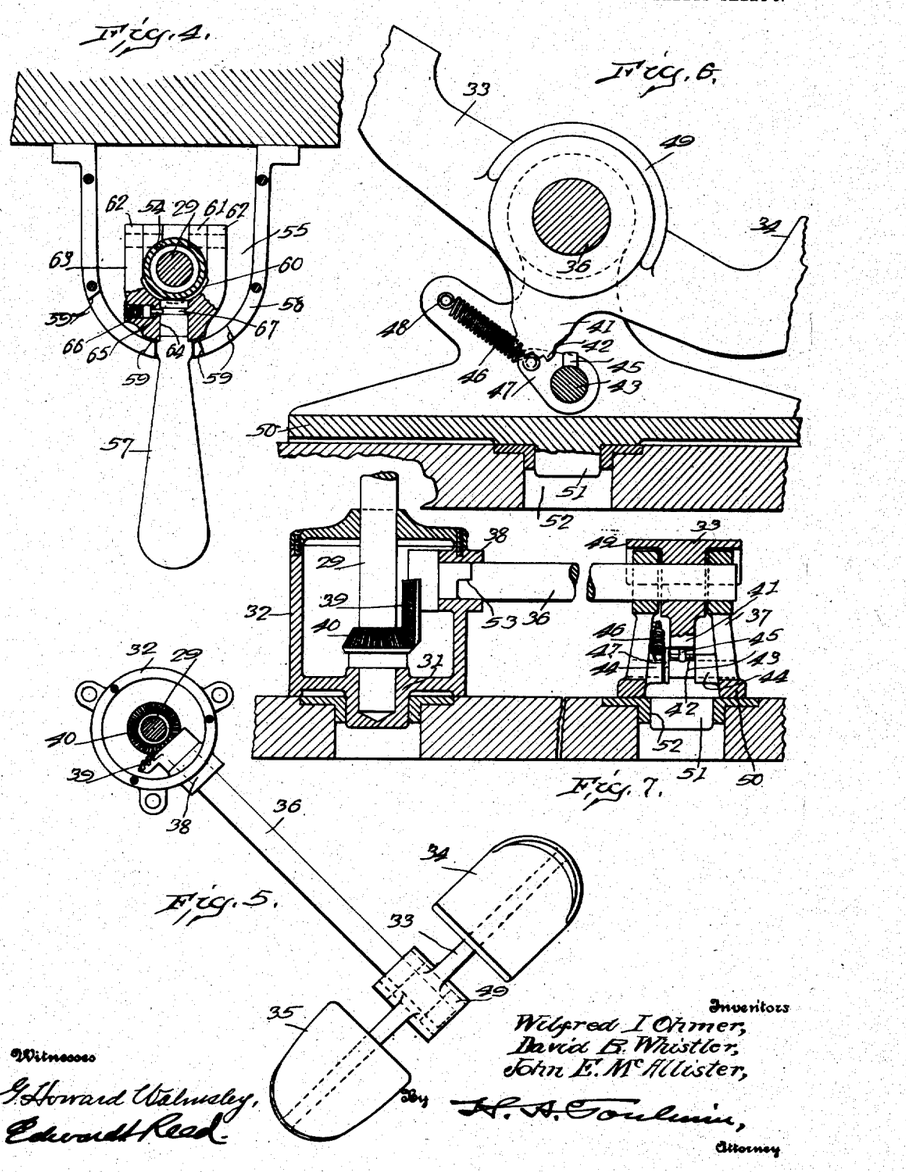
Fig. 4 is a top, plan view of the actuating device for that portion of the mechanism which actuates the setting shaft.
Fig. 5 is a top, plan view of the foot-operated device for actuating that portion of the mechanism which operates the actuating member for the register.
Fig. 6 is a sectional view, taken longitudinally to the foot-operated device.
Fig. 7 is a sectional view, taken transversely to the foot-operated device.

The lower crank arm 27 is rigidly secured to the upper end of a shaft 54, which shaft is preferably hollow and telescopes the shaft 29. The hollow shaft 54 is supported at its lower end upon a bracket 55 and at its upper end in a bearing 56. A handle 57 is connected to the shaft 54 to rotate the same and thus, through the medium of the crank arm 27, connecting rod 25 and bell crank lever 21, impart longitudinal movement to the lower operating rod 10. The bracket 55 is provided about its edge with an upwardly extending flange 58 having formed thereon a series of projections 59 constituting stops adapted to be engaged by the handle 57 and positively limit its movement when the shaft 54 has been rotated a distance sufficient to set the register to register the desired fare. The flange 59 may, if desired, be provided with indications arranged near each stop to indicate the fare which the register is set to register when the handle is in engagement with that particular stop. It will be noted that two of the stops, preferably those corresponding to the fares most used and shown, in the present instance, as the "five cent" and "transfer" stops, are arranged at opposite ends of a straight cutaway portion and the handle can be moved into engagement with either of these stops by a straight sliding movement. In order to bring it into engagement with either of the other stops it is necessary that a vertical movement should be imparted thereto to lift it over the intermediate stops. To permit this vertical movement to be imparted to the handle 57 it is so connected to the shaft 54 that it will move about a horizontal axis. As here shown, the shaft has secured thereto a band or collar 60 having on that side thereof opposite the handle 57 lugs 61, to which are pivotally connected the arms 62 of a yoke 63 extending about the hollow shaft 54 and having formed therein, on that side of the shaft opposite the lug 61, a socket or horizontal opening 64 adapted to receive the end of the handle 57. This handle is removably secured within the socket 64 by means of a pin 65 mounted in a recess formed in the yoke adjacent to the socket 64 and pressed inwardly by a spring 66. The handle 57 has an annular groove 67 adapted to receive the end of the pin 65. This groove has its inner edge rounded, as is also the corner at the end of the handle. Consequently, a thrust inward on the handle will cause the inclined or rounded corner thereof to engage the pin 65 and force the same outwardly against the tension of the spring and permit the handle to be seated in the socket. When the handle is thus seated the pin will enter the groove 67 and will retain the handle in position until an outward pull is exerted thereon of sufficient force to overcome the tension of the spring 66 and force the pin out of the groove. Thus, the handle 57 can be detached and transferred from one end of the car to the other.

It is desirable that the character of the fare which is registered should be disclosed to the passengers in all parts of the car. We have, therefore, mounted on each partition 1, in alinement with the glass panel 3 a double indicator comprising a casing 68 having a sight opening in each side thereof. A double indicator drum 69 is rotatably mounted within the casing 68 and is provided with a double series of fare indications, these indications being so arranged upon the drum that the same indication will appear simultaneously at each sight opening. The drum is preferably mounted on a horizontal shaft and is operatively connected to the vertical shaft 54 by means of suitable gearing 70. In this manner the actuation of the vertical shaft 54 to operate the setting devices of the register will move the indicator and will cause the same to disclose both to the passengers in the car and to those on the platform the character of the fare which the machine is set to register. It will be noted that movement will be simultaneously imparted to the indicators at both ends of the car by the operation of the actuating device at either end of the car, this being due to the fact that both vertical shafts 54 are permanently connected to the operating rod for the setting member and that the movement of either of the shafts 54 will impart a corresponding movement to the other shaft 54. Some of the cars of the type to which the invention is applied are very long, and, for that reason, it is difficult for all the passengers within the car to read the indications at the ends thereof and thus it may sometimes be desirable to arrange a third indicator centrally of the car. In the present instance we have shown such an indicator at 71. This indicator is of the same type as those above described comprising the casing having the two sight openings and the double indicator drum journaled within the same. In the present arrangement of the indicator the casing is supported from a bracket or frame 72 extending across the upper portion of the car and supported from the side walls thereof. This bracket has depending bearing lugs 73 in which are journaled the opposite ends of the indicator shaft 74. We have here shown this indicator shaft as extending beyond both sides of the indicator casing and supported at each end in bearings at the sides of the car, this being done to secure an additional bracing or reinforcing effect. That end of the shaft 74 adjacent the operating rods 10 and 11 has mounted thereon a pinion 75 which meshes with a rack carried by the operating rod 10 for the setting member of the register. This rack, in the present instance, comprises a series of teeth 76 formed in the upper side of the adjacent portion of the rod 10. Consequently, the longitudinal movement of this operating rod will impart a rotary movement to the indicator. This indicator is also preferably provided with a flasher which, in the form here shown, consists of two shutters 77 supported at the opposite ends of double levers 78 and adapted to be moved in front of the sight openings in the casing 71. The levers 78 are pivotally mounted on the indicator shaft 74 and one of them has a depending portion 79 in which is formed a slot 80 to receive a pin 81 carried by a rock arm 82 which is rigidly secured to a rockshaft 83 which extends substantially parallel with the indicator shaft 74 and is rotatably mounted in bearings carried by the casing of the indicator 71 and by the brackets supporting the operating rods, respectively. It will be apparent that the rocking of the shaft 83 will cause the lever 78 carrying the shutters to move about its pivotal center and will move the shutters toward or away from the sight openings as the case may be. This rocking movement may be imparted to the rockshaft 3 in any suitable manner, but we have, in the present instance, shown the rockshaft 83 as having a second arm 84 rigidly secured thereto and arranged near the operating rod 11 which imparts movement to the actuating devices for the register. A plate 85 is rigidly secured to and depends from this operating rod and has formed therein a cam slot 86 into which projects a pin 87 carried by the rock arm 84. That portion of the cam slot 86 adjacent to the normal position of the pin 87 is arranged at a sharp angle to the operating rod 11 and the remainder of the slot is substantially parallel with the rod 11. It will be apparent, therefore, that the first portion of the movement of the operating rod 11, when the same is actuated, will impart the necessary rocking movement to the shaft 83 and cause the shutters to move in front of their respective sight openings, and that the remainder of the movement of the rod will merely hold the shutters in this position. As the rod approaches its normal position on the return movement the pin 87 will again enter the sharply inclined portion of the cam slot and will move the shutters away from their sight openings and thus disclose the indication on the indicator drum.

If desired, signal mechanism of a suitable character may be supplied in addition to the flasher for the purpose of attracting attention to the indicator each time a fare is registered. For this purpose we have here shown the mechanism as equipped with a bell ringing device. A bell 88 is mounted on a bracket 89 secured to the side of the car just above the operating rod 11 for the actuating mechanism of the register. Pivotally mounted on a stud shaft 90 also carried by the bracket 89 is a hammer arm 91 having at its outer end a hammer 92. A spring 93 tends normally to hold the arm 91 against a stop 94 carried by the bracket 89, and, when the arm is in engagement with the stop, the hammer 92 will be slightly removed from the bell 88. The arm 91 has sufficient resiliency, however, to permit the hammer 92 to come in contact with the bell 88 when the arm is brought violently in contact with the stop 94. An actuating arm 95 is pivotally mounted on the stud shaft 90 which carries the hammer arm and has a laterally extending portion or projection 96 arranged beneath the hammer arm 91 and also has a second projection or finger 97 extending into the path of a projection or stop 98 rigidly secured to the operating rod 11. A spring 99 tends to move the arm 95 in such a direction as to hold the stop 96 normally in engagement with the hammer arm 91. When the operating rod 11 is moved in one direction the stop or projection 98 will engage the finger 97 and move the arm 95 about its pivotal center against the tension of the spring 99 a sufficient distance to permit the stop 98 to pass the finger 97. On the return movement of the rod 11 the stop 98 will engage the opposite side of the finger 97, and, inasmuch as the arm 95 is held against movement in that direction independently of the hammer arm 91, both the actuating arm and the hammer arm will be moved about their pivotal center a distance sufficient to permit the stop 98 to pass the finger 97. As soon as the finger 97 is free from the stop, the spring 93 will move the hammer arm violently into engagement with the stop 94 and cause the hammer 92 to engage the bell 88.

Figures 13, 14, 15, 16:
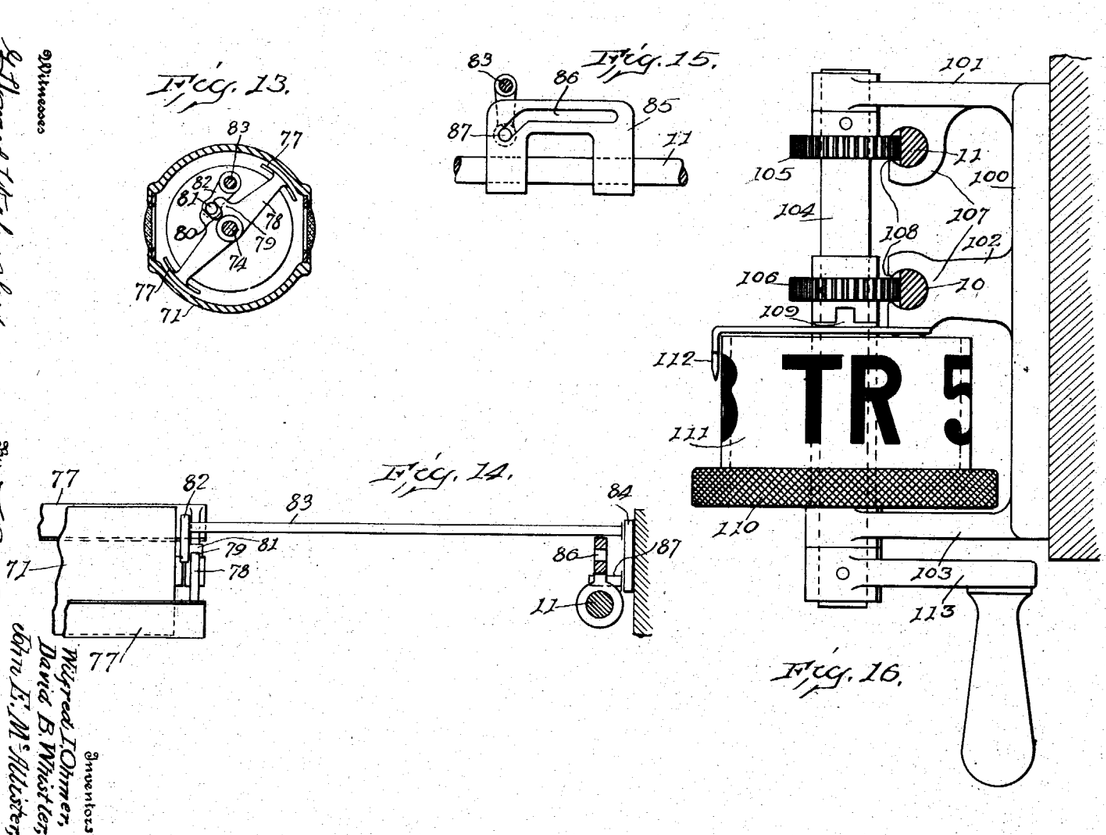
Fig. 13 is a transverse, sectional view of the central indicator.
Fig. 14 is a front elevation of a portion of the central indicator, showing the operating mechanism for the flasher.
Fig. 15 is a detail view of the cam plate for operating the flasher.
Fig. 16 is a side elevation of the supplementary actuating devices for the operating rods.

While in the ordinary operation of the mechanism the fares will be registered from one end or the other of the car, there are times when it is desirable to register the fares from the inside of the car, such, for instance, as when passengers have entered the car at a terminal point during the absence of the conductor. To enable the fares to be registered from the interior of the car we have provided actuating devices for imparting longitudinal movement to each of the operating rods 10 and 11 and these devices are supported preferably at a point near the center of the car and are arranged at such a height as to be within the reach of the conductor, but to occupy a position in which they will not interfere with the other equipment or with the passengers in the car. These actuating devices are supported by a bracket 100 secured to the side of the car and have inwardly extending arms 101, 102 and 103. The upper and lower arms 101 and 103 have bearings in which is journaled a shaft 104. This shaft has mounted thereon two pinions 105 and 106 adapted to mesh with racks carried by the rods 11 and 10, respectively, and, in the present instance, comprise teeth formed in the sides of said rods adjacent to the shaft 104. These rods are here shown as supported in bearing lugs 107 carried by the arms 101 and 102 and having the sides adjacent to the shaft 104 slotted, as shown at 108, to permit the pinions 105 and 106 to engage the respective racks. By arranging the pinions adjacent to the bearing lugs these lugs hold the rods in engagement with their respective pinions and prevent any springing or lateral displacement of the rods. The lowermost pinion 106, which meshes with the operating rod 10, is loosely mounted on the shaft 104 and is connected to a sleeve 109 which is also rotatably mounted on the shaft 104 and is provided at its lower end with a milled flange 110, by means of which both the sleeve and the pinion may be rotated independently of the shaft and thereby impart longitudinal movement to the operating rod 10 which actuates the setting member for the register. This actuating device is preferably provided with an indicator, which, in the present instance, comprises a vertically arranged drum or flange 111 which is rigidly secured to and rotates with the milled flange 110. This drum has thereon the usual fare indications corresponding to the indications on the several indicators. A pointer 112, which is secured to a fixed part of the bracket 100, extends along one side of the drum and is so arranged as to indicate that fare indication corresponding to the fare which the register has been set to register. The upper pinion 105, which meshes with the operating rod 11 for the actuating member for the register, is rigidly secured to the shaft 104. Rotary movement may be imparted to the shaft 104 to impart longitudinal movement to the rod 11 in any suitable manner. In the present instance we have shown a handle 113 rigidly secured to the shaft 104 and arranged in a position in which it may be easily actuated by the conductor, thereby imparting to the shaft 104 and the rod 11 the movement necessary to operate the actuating member of the register.

The operation of the mechanism as a whole will be readily understood from the foregoing description of the several parts thereof, and it will be apparent that the independently reciprocating operating rods afford an easy and absolutely reliable means for actuating the setting mechanism and actuating mechanism for the register; that the actuating devices for these rods are so arranged as to be easily and quickly operated by the conductor from his position on the platform; that the fares registered by him are indicated to the passengers at all points within the car and on both platforms; and that the attention of the passengers is attracted to these indications by suitable signal mechanism, all of which is actuated by the operation of this mechanism. It will be apparent that the nature of this mechanism is such that it will not be easily broken or disarranged, and, consequently, there is little liability of the registration of fares being interrupted by a break down of the operating mechanism; further, that the mechanism is of a light weight and of a compact, convenient form which enables it to be mounted in the car in such a position that it will not interfere with the movement of the passengers or with any of the other equipment of the car, and, when so mounted, will present a neat finished appearance, adding to, rather than detracting from, the appearance of the car.

While we have here shown and described one embodiment of our invention and have shown one manner of carrying out each of the several details thereof, it will be readily apparent that the construction and arrangement as a whole and in detail is capable of a wide variation without departing from the spirit of our invention. We, therefore, wish it to be understood that we do not desire to be limited to the details of construction shown and described, for obvious modifications will occur to a person skilled in the art.

Having thus fully described our invention, what we claim as new and desire to secure by Letters Patent, is:—

1. The combination, with a register adapted to be mounted in a car and having a setting member and an actuating member, of two operating members movable longitudinally with respect to the car when mounted therein, and connecting members extending transversely to said operating members and operatively connecting the same to said setting member and said actuating member, respectively.

2. The combination, with a register adapted to be mounted in a car and having a setting member and an actuating member, of two operating rods movable longitudinally with reference to the car when mounted therein, connecting members extending transversely to said rods and operatively connecting the same to said setting member and said actuating member, respectively, and means for imparting longitudinal movement to each of said rods.

3. The combination, with a register having a setting member and an actuating member, of two longitudinally movable operating rods, means for connecting one of said rods to said setting member to impart rotary movement thereto, and means for connecting the other of said rods to said actuating member to impart reciprocatory movement thereto.

4. The combination, with a register having a setting member, and an actuating member, of two longitudinally movable operating rods, a rack carried by one of said rods, a gear meshing with said rack and operatively connected to said setting member, a bell crank lever pivotally supported by the other of said rods and having one arm operatively connected thereto, and the other arm operatively connected to said actuating member.

5. The combination, with a car comprising a main portion and a platform and having a partition separating said main portion from said platform, and a register mounted within the main portion of said car and having a setting member and an actuating member, of two longitudinally movable actuating rods mounted in said car, operatively connected to said setting member and said actuating member, respectively, and extending beyond said partition, two vertically arranged shafts rotatably mounted on said partition and operatively connected to said longitudinally movable rods, hand operated means for imparting rocking movement to one of said shafts, and foot operated means for imparting rocking movement to the other of said shafts.

6. The combination, with a car comprising a main portion and a platform and having a partition separating said main portion from said platform, and a register mounted within the main portion of said car and having a setting member and an actuating member, of two longitudinally movable operating rods mounted in the main portion of said car, operatively connected to said setting member and said actuating member, respectively, and extending beyond said partition, two vertically arranged shafts mounted on said partition, a crank arm carried by each of said shafts, bell crank levers supported on said partition, connecting rods secured at one end to the crank arms on the respective shafts and connected at their other ends to the adjacent arms of said bell crank levers, the other arms of said bell crank levers being connected to the respective operating rods, hand operated means for imparting a rocking movement to one of said shafts, and foot actuated means for imparting a rocking movement to the other of said shafts.

7. The combination, with a car comprising a main portion and a platform and having a partition separating said main portion from said platform, and a register mounted within the main portion of said car and having a setting member and an actuating member, of two longitudinally movable operating rods mounted in the main portion of said car, operatively connected to said setting member and said actuating member, respectively, and extending beyond said partition, two telescoping shafts mounted on said partition and independently rotatable, means for operatively connecting said shafts to the respective operating rods, a handle secured to one of said shafts to impart rocking movement thereto, and a series of positive stops to limit the movement of said handle and its shaft, and a foot lever supported on the floor of said platform and operatively connected to the other of said shafts to impart rocking movement thereto.

8. In an operating mechanism of the character described, the combination, with two longitudinally movable operating rods, of two vertically arranged shafts, means for operatively connecting each of said shafts with one of said operating rods, a bevel pinion secured to the lower end of one of said shafts, a horizontal shaft having a bevel gear meshing with said bevel pinion, a foot lever operatively connected to said horizontal shaft, and means for imparting movement to the other of said shafts.

9. In an operating mechanism of the character described, the combination, with two longitudinally movable operating rods, of two vertically arranged shafts, means for operatively connecting each of said shafts to one of said rods, respectively, a foot lever, means for detachably connecting said foot lever to one of said shafts, and means for actuating the other of said shafts.

10. In an operating mechanism, the combination, with a car comprising a body portion and a platform, and a register mounted in said car and having a setting member and an actuating member, of two actuating devices removably supported above said platform, and means for operatively connecting said actuating devices to the setting member and actuating member of said register, respectively.

11. In an operating mechanism, the combination, with a car comprising a body portion, a platform, and a partition separating said body portion from said platform, and a register mounted in said car and having a setting member and an actuating member, of two actuating devices, one of which is mounted on said platform and the other of which is mounted on said partition, and means for operatively connecting said actuating devices to said setting member and said actuating member, respectively.

12. In an operating mechanism, the combination, with a car comprising a body portion and a platform, and a register mounted in said car and having a setting member and an actuating member, of two shafts mounted on said platform and movable relatively one to the other, a handle detachably connected to one of said shafts, a foot lever detachably connected to the other of said shafts, and means for operatively connecting said shafts with the setting mechanism and actuating mechanism, respectively, of said register.

13. In an operating mechanism, the combination, with a car comprising a body portion and a platform, and a register mounted in said car and having a setting member and an actuating member, of two telescoping shafts movable relatively one to the other, a handle for imparting rotary movement to the outer of said shafts, means for operatively connecting said outer shaft with the setting member of said register, a foot lever supported on said platform and detachably connected to the inner shaft, and means for operatively connecting said inner shaft to the actuating member for said register.

14. In an operating mechanism, the combination, with a car comprising a body portion and a platform, and a register mounted in said car and having a setting member and an actuating member, of two telescoping shafts movable relatively one to the other, a handle for imparting rotary movement to the outer of said shafts, means for operatively connecting said outer shaft with the setting member of said register, a foot lever supported on said platform and operatively connected to the inner shaft, means for operatively connecting said inner shaft to the actuating member for said register, and full-stroke mechanism operatively connected to said foot lever.

15. In an operating mechanism, the combination, with a car comprising a body portion and a platform, and a register mounted in said car and having a setting member and an actuating member, of two shafts mounted on said platform and operatively connected to said setting member and said actuating member, respectively, a yoke mounted on one of said shafts and having a socket, a handle having a part adapted to enter said socket, and means for detachably securing said handle in said socket, and foot operated means for actuating the other of said shafts.

16. In an operating mechanism, the combination, with a car comprising a body portion and a platform, and a register mounted in said car and having a setting member and an actuating member, of two rotatable shafts operatively connected to said setting member and said actuating member, respectively, a bevel pinion rigidly secured to the lower end of one of said shafts, a bevel gear meshing with said bevel pinion, an elongated bearing supported near said bevel gear, a two part shaft for said gear having its adjoining ends scarfed and supported within said elongated bearing, a re- movable bearing bracket for the outer end of said shaft, a foot lever rigidly secured to said shaft, and means for actuating the other of said shafts.

17. In an operating mechanism, the combination, with a register having a setting member, and an actuating member, of two telescoping shafts operatively connected to said setting member and said actuating member, respectively, a fixed bracket surrounding the innermost of said shafts and having a bearing for the outermost of said shafts, a handle connected to said outer shaft to move about a horizontal axis and held against rotary movement relatively to said outer shaft, a plurality of projections on said bracket forming stops to limit the movement of said handle, and means actuating said inner shaft.

18. An operating mechanism of the character described comprising a rotatable shaft, a handle secured to said shaft and held against rotary movement relatively thereto and capable of a limited movement longitudinally to said shaft, a bracket extending about said shaft, and a plurality of projections on said bracket forming stops to limit the movement of said handle and said shaft.

19. In a mechanism of the character described, the combination, with two longitudinally movable operating rods having toothed racks, of a shaft extending transversely to said operating rods, a pinion loosely mounted on said shaft and meshing with the rack of one of said rods, means for actuating said pinion, a second pinion mounted on said shaft and meshing with the rack of the other of said rods, and means for actuating said second pinion independently of the first-mentioned pinion.

20. In a mechanism of the character described, the combination, with two longitudinally movable operating rods having toothed racks, of a shaft extending transversely to said operating rods, a sleeve rotatably mounted on said shaft, a pinion operatively connected to said sleeve and meshing with the rack on one of said rods, means for rotating said sleeve, a second pinion rigidly mounted on said shaft, and means for rotating said shaft independently of said sleeve.

21. In a mechanism of the character described, the combination, with two longitudinally movable operating rods having toothed racks, of a sleeve rotatably mounted on said shaft, a pinion operatively connected to said sleeve and meshing with the rack of one of said rods, means for rotating said sleeve, an indicator carried by said sleeve, a second pinion rigidly secured to said shaft and meshing with the rack of the other of said rods, and means for rotating said shaft.

22. In a mechanism of the character described, the combination, with two longitudinally movable operating rods having toothed racks, of a shaft extending transversely to said operating rods, a sleeve rotatably mounted on said shaft, a pinion operatively connected to said sleeve and meshing with the rack of one of said rods, a milled flange for rotating said sleeve, an indicator drum carried by said sleeve, a pointer cooperating with said drum, a second pinion rigidly secured to said shaft and meshing with the rack of the other of said rods, and a handle for imparting rotary movement to said shaft.

23. The combination, with a car comprising a body portion having a platform at each end thereof, partitions separating said body portion from said platforms, windows in said partitions, a register mounted within said body portion, and means for operating said register, of an indicator mounted adjacent to each of said windows and arranged in such a manner as to be visible from within the car and from the adjacent platforms, and means actuated by said operating mechanism for actuating said indicator.

24. The combination, with a car comprising a body portion having a platform at each end thereof, partitions separating said body portion from said platforms, windows in said partitions, a register mounted within said body portion, and means for operating said register, of an indicator mounted adjacent to each of said windows and arranged in such a manner as to be visible from within the car and from the adjacent platforms, a double indicator arranged within said body portion, and means controlled by said operating mechanism for actuating each of said indicators.

25. The combination, with a register having a setting member, a rod operatively connected to said setting member, means for actuating said register to register a fare, of an indicator comprising a casing having sight openings in both sides thereof, a double indicator drum mounted within said casing, a shaft for said drum extending beyond one side of said casing and having a pinion, and a rack carried by said rod and meshing with said pinion, whereby the movement of said rod will actuate said indicator drum.

26. In a mechanism of the character described, the combination, with two longitudinally movable operating rods, and means for actuating the same, of an indicator, means controlled by the movement of one of said rods for actuating said indicator, a flasher coöperating with said indicator, and means controlled by the movement of the other of said rods for operating said flasher.

27. In a mechanism of the character described, the combination, with a longitudinally movable operating rod, means for imparting movement to said rod, an indicator, and means for actuating said indicator, of a flasher arranged to coöperate with said indicator, a rockshaft operatively connected with said flasher, a crank arm rigidly secured to said rockshaft, and means for operatively connecting said crank arm to said longitudinally movable rod.

28. In a mechanism of the character described, the combination, with a longitudinally movable operating rod, means for imparting movement to said rod, an indicator, and means for actuating said indicator, of a flasher arranged to coöperate with said indicator and comprising a lever, a shutter carried thereby, a rockshaft operatively connected to said lever, a crank arm rigidly secured to said rockshaft and having a laterally extending projection, and a part carried by said rod having a cam groove adapted to receive said projection and actuate said rockshaft.

29. In a mechanism of the character described, the combination, with two longitudinally movable operating rods, means for independently actuating said rods, an indicator comprising a casing having a sight opening therein, an indicator drum mounted in said casing and having a shaft extending beyond one end of said casing, a pinion mounted on said shaft, and a rack carried by one of said rods and meshing with said pinion, of a flasher comprising a shutter, a lever connected thereto and pivotally mounted on said shaft, a rockshaft, a crank arm secured to said rockshaft and operatively connected to said lever, a second crank arm carried by said rockshaft, a pin carried by said second crank arm, and a plate rigidly secured to the other of said operating rods and having a cam slot to receive said pin.

30. In a mechanism of the character described, the combination, with a longitudinally movable operating rod, of a bell supported adjacent to said rod, a hammer arm pivotally supported near said bell, a hammer carried by said arm and arranged to engage said bell, and means actuated by the longitudinal movement of said operating rod for actuating said hammer arm and said hammer.

31. In a mechanism of the character described, the combination, with a longitudinally movable operating rod, and a bell, of a hammer arm pivotally supported near said bell, a hammer carried by said arm, a stop to limit the movement of said hammer arm in one direction, a spring tending to hold said hammer arm in engagement with said stop, and means actuated by the movement of said operating rod to move said hammer arm against the tension of said spring and release the same.

32. In a mechanism of the character described, the combination, with a longitudinally movable operating rod, and a bell, of a hammer arm pivotally mounted adjacent to said bell, a hammer carried by said arm, a spring tending to move said hammer arm in one direction, an actuating arm pivotally mounted near said hammer arm and having a projection arranged to engage said hammer arm, a finger carried by said actuating arm, and a projection carried by said operating rod adapted to engage said finger to move said actuating arm about its pivotal center and, through the medium of the projection carried by said actuating arm and engaging said hammer arm, to move said hammer arm against the tension of said spring.

33. In a mechanism of the character described, the combination, with a longitudinally movable operating rod, and a bell, of a stud shaft, a hammer arm loosely mounted on said stud shaft, a hammer carried by said arm, a stop to limit the movement of said arm in one direction, a spring tending to hold said hammer arm in engagement with said stop, an actuating arm pivotally mounted on said stud shaft and having a laterally extending projection arranged to engage that side of said hammer arm adjacent to said bell, a spring tending to hold said projection normally in engagement with said hammer arm, a finger carried by said actuating arm, and a projection carried by said operating rod and adapted to engage said finger.

34. The combination with a register having a setting member, and an actuating member, of two vertically arranged and rotatably mounted shafts, and connections between said shafts and said setting member and said actuating member, respectively, whereby, movement from one of said shafts is transmitted to said setting member to set the register to register a selected fare and movement from the other of said shafts is transmitted to said actuating member to operate the register to register a fare.

35. The combination, with a register having a setting member and an actuating member, of two telescopic vertically arranged and rotatably mounted shafts, and connections between said shafts and said setting member and said actuating member, respectively, whereby movement from one of said shafts is transmitted to said setting member to set the register to register a selected fare and movement from the other of said shafts is transmitted to said actuating member to operate the register to register a fare.

36. The combination, with a car comprising a main portion and a platform and having a partition separating said main portion from said platform, and a register mounted within the main portion of said car and having a setting member and an actuating member, of two vertically arranged and rotatably mounted shafts, and connections between said shafts and said setting member and said actuating member, respectively, whereby movement from one of said shafts is transmitted to said setting member to set the register to register a selected fare and movement from the other of said shafts is transmitted to said actuating member to operate the register to register a fare.

37. The combination, with a car comprising a main portion and a platform and having a partition separating said main portion from said platform, and a register mounted within the main portion of said car and having a setting member and an actuating member, of two telescopic vertically arranged and rotatably mounted shafts, and connections between said shafts and said setting member and said actuating member, respectively, whereby movement from one of said shafts is transmitted to said setting member to set the register to register a selected fare and movement from the other of said shafts is transmitted to said actuating member to operate the register to register a fare.

In testimony whereof, we affix our signatures in presence of two witnesses.

WILFRED I. OHMER.
DAVID B. WHISTLER.
JOHN E. McALLISTER.

Witnesses:
ROBERT E. COWDEN,
TRACY G. WHISTLER.

Copies of this patent may be obtained for five cents each, by addressing the "Commissioner of Patents, Washington, D. C."